United States Patent
Smith et al.

(10) Patent No.: US 6,728,096 B1
(45) Date of Patent: Apr. 27, 2004

(54) NON-AQUEOUS ELECTROLYTE

(75) Inventors: W. Novis Smith, Philadelphia, PA (US); Joel McCloskey, Philadelphia, PA (US)

(73) Assignee: Lithdyne International, Anaheim, CA (US)

( * ) Notice: Subject to any disclaimer, the term of this patent is extended or adjusted under 35 U.S.C. 154(b) by 9 days.

(21) Appl. No.: 10/405,415

(22) Filed: Apr. 2, 2003

Related U.S. Application Data

(63) Continuation-in-part of application No. 10/170,559, filed on Jun. 12, 2002, now Pat. No. 6,535,373.

(51) Int. Cl.[7] ............................................. H01G 9/00
(52) U.S. Cl. ................ 361/523; 361/528; 361/502; 361/503; 361/516; 429/215; 429/217; 29/25.03
(58) Field of Search ................................. 361/523, 528, 361/502, 503, 504, 508, 512, 516, 525, 511, 505; 429/215, 217; 29/25.03

(56) References Cited

U.S. PATENT DOCUMENTS

| | | | |
|---|---|---|---|
| 4,132,837 A | * | 1/1979 | Soffer |
| 5,595,841 A | * | 1/1997 | Suzuki |
| 6,265,106 B1 | * | 7/2001 | Gan et al. |
| 6,315,918 B1 | * | 11/2001 | Mita et al. |
| 6,426,863 B1 | * | 7/2002 | Munshi |

* cited by examiner

Primary Examiner—Dean A. Reichard
Assistant Examiner—Nguyen T. Ha
(74) Attorney, Agent, or Firm—John Lezdey & Assoc

(57) ABSTRACT

A non-aqueous electrolyte for use in batteries and electrical capacitors for use at low temperatures. The electrolyte consists of at least two electrolyte salts in an electrochemical solvent or at least one electrolyte salt in a mixture of electrochemical solvents.

19 Claims, 1 Drawing Sheet

NON-AQUEOUS ELECTROLYTE

RELATED APPLICATIONS

This application is a continuation-in-part and an improvement over application Ser. No. 10/170,559 filed Jun. 12, 2002 entitled "Non-Aqueous Electrolyte", now U.S. Pat. No. 6,535,373.

FIELD OF THE INVENTION

The present invention relates to electrolytes which are useful for various electrochemical elements. More particularly, there is provided a mixture of quaternary ammonium salts which are useful at low temperatures, especially for use in electronic devices such as super capacitors and double layer capacitors (DLCs) in combination with preferably a carbonate solvent and/or lactone solvent.

BACKGROUND OF THE INVENTION

The basic components of electrical capacitors include conductive electrodes connected to an electric power supply and a dielectric material separating the electrodes. Electrolytic capacitors and electrochemical double layer capacitors also have an electrolyte. In an electrolytic capacitor, the dielectric is provided by an oxide layer formed on a metal foil and the electrolyte provides electrical contact to the opposite electrode. The inherently high resistance of electrolytic capacitors is generally mitigated by rolling a large sheet of the material into a roll. In an electrochemical double layer capacitor, the dielectric is provided by the electrolyte. In this type of capacitor, the resistance of the electrolyte is a significant factor in the total device resistance. In capacitors that use electrolytes, the electrolyte also has a major influence on the temperature performance of the capacitor.

Electrochemical double layer capacitors, including super capacitors, typically comprise electrodes, electrical contacts to a power supply, separators for electrode and/or cells, an electrolyte and environmental seals. As mentioned above, a key component of electrolytic and electrochemical double layer capacitors is the electrolyte, which typically comprises a combination of a salt and a solvent. Desirable electrolytes are typically liquid with low viscosity, low density, and high conductivity over a range of ambient temperature conditions. They should also be commercially inexpensive, chemically and electrochemically stable, and compatible with carbon. Aqueous electrolyte systems have been used extensively, but certain organic liquid systems are less prone to form gas and can be more effective in providing higher energy densities over a wider usable range of temperature and potential. In addition, these organic electrolytes permit higher voltage and therefore results higher capacity in the capacitors. A need exists for improved electrolyte systems that provide optimum capacitance for capacitors to achieve high power density, a wide temperature range, and a long lifetime without memory effects.

The key requirements for both nonaqueous batteries and capacitors are low temperature performance, electrochemical stability, and lower costs.

European patent application EPO 0984471 A2 which is herein incorporated by reference, discloses a method for producing electric double layer capacitors which contains tetrafluoroborate and hexafluorophosphate of imadazolium derivatives, which can be used in the present invention.

U.S. Pat. No. 5,418,682 to Warren et al, which is herein incorporated by reference discloses a method of preparing tetraalkyl ammonium tetrafluoroborate salts for use as electrolytes with dinitrile mixtures as solvents.

U.S. Pat. No. 5,965,054 to McEwen et al, which is herein incorporated by reference discloses non-aqueous electrolytes for electrical storage devices utilizing salts consisting of alkyl substituted, cyclic delocalized aromatic cations and their perfluoro derivatives with alkyl carbonate solvents.

Of the quaternary ammonium tetrafluoroborate salts, it has been found that tetraethylammonium tetrafluoroborate (TEATFB) is the most advantageous because of its stability and conductivity. However, a major disadvantage is that its solubility is limited and it starts to freeze out at about $-30°$ C. from solutions, thereby lowering low temperature performance.

SUMMARY OF THE INVENTION

The present invention comprises an improvement in non-aqueous electrolytes for use in non-aqueous batteries and double layer capacitors as the result of using an electrolyte salts and one or more organic electrochemical solvents. More particularly there is provided a composition which at a concentration of about 0.4 to 2.5M, preferably to about 1.6M and most preferably to about 1.0M has a conductivity in the range of about 10 to 20 mS/cm at $20°$ C. and can be cooled to at least $-25°$ C. The improvement is achieved with the use of an electrolyte system wherein a mixture of electrolyte salt is used with one or more solvents or one electrolyte salt is used with at least two electrochemical solvents.

It has been found to be advantageous that one of the electrolyte salts is tetraethylammonium tetrafluoroborate, or methyltriethylammonium tetrafluoroborate.

It has been found to be most advantageous to use at least two different electrolyte salts in combination with two different electrochemical solvems.

It is therefore an object of the invention to provide a non-aqueous electrolyte comprising mixtures of conductive electrolyte salts and/or a mixture of solvents which can be used in batteries and double layer capcitors.

It is a further object of the invention to provide a non-aqueous electrolyte capable of performance at low temperatures.

It is a still further object of the invention to provide an improved double layer capacitor.

Other features and advantages of the invention will be apparent from the following description of the preferred embodiments thereof and from the claims, taken in conjunction with the following drawing.

BRIEF DESCRIPTION OF THE PREFERRED EMBODIMENTS

Figure 1:
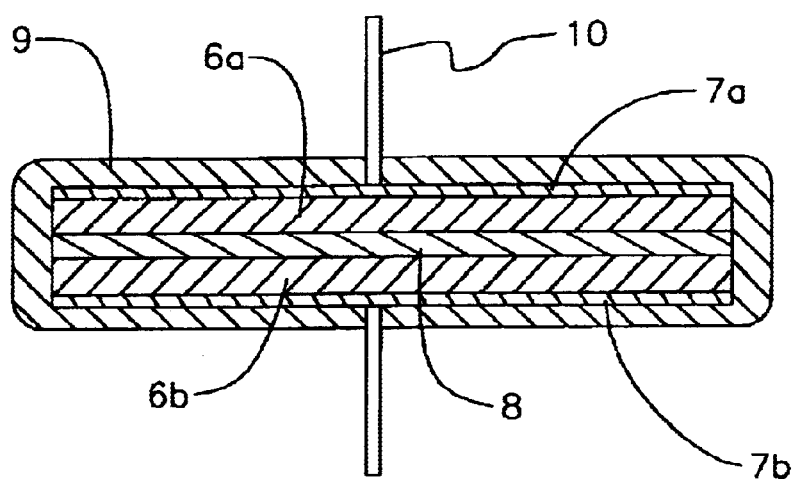
FIG. 1 is an example of one type of double layer capacitor which can be used with the non-aqueous electrolyte of the invention.

FIG. 1 shows a schematic cross section of one example of the electric double layer of the present invention. This example shows a thin-type cell having a size of 1 cm×1 cm and a thickness of about 0.5 mm, where 7a and 7b are collector bodies, a pair of polarizable electrodes 6a and 6b are disposed inside of the collector bodies, and an electrolyte 8 is disposed therebetween. The numeral 9 is an insulating resin sealant and 10 is a lead wire.

The material used for the collector body 7 is electronically conductive and electrochemically anticorrosive, and preferably has a specific surface area as large as possible. Examples thereof include various metals and a sintered body thereof, electronic conductive polymers and carbon sheet.

The polarizable electrode 6 may be an electrode comprising a polarizable material such as a carbon material usually used in an electric double layer capacitor. The carbon material as the polarizable material is not particularly restricted as long as the specific surface area is large, however, carbon materials having a larger specific surface area are preferred because the electric double layer can have a large capacity. Examples thereof include carbon blacks such as furnace black, thermal black (including acetylene black) and channel black, activated carbons such as coconut husk carbon, natural graphite, artificial graphite, so-called pyrolytic graphite obtained by the vapor phase process, polyacene, $C_{60}$ and $C_{70}$.

A key component of electrolytic and electrochemical double layer capacitors of the invention is the electrolyte 14, which generally comprises a combination of one or more electrolyte salts and one or more organic electrochemical solventst. The electrolyte 14 is chemically and electrochemically stable, compatible with carbon, commercially inexpensive, relatively low viscosity in a range of ambient temperature conditions, and operable at temperatures at least about $-20°$ C., preferably less than $-30°$ C. Aqueous electrolyte systems are in wide-spread use, but certain organic liquid systems can be more effective in providing a greater usable range of electric potential, energy density, and operating temperature. The dielectric constant of the solvent is also important in achieving optimum power and utilization of the capacitance because it affects both the double layer capacitance and the electrolytic conductivity. The improved capacitors of the present invention use specific organic electrolytes to provide optimum capacitance, high power density (on the order of ten kilowatts per kilogram), high energy density (on the order of ten watt-hours per kilogram, or ten watt-hours per liter), and long lifetime without memory effects when used with a suitable solvent.

Among organic electrochemical solvents, polypropylene carbonate, polyethylene carbonate, gamma butyrolactone, 2-methylglutaronitrile, succinonitrile, and dimethoxyethane (ethylene glycol dimethyl ether) are especially useful because they are generally nonreactive and achieve low temperature performances. There is included in the electrolyte the salt of a cation selected from the group consisting a non-aqueous electrolyte for electric storage devices which comprises a conductive solvent and a conductive salt selected from the group consisting of (a) an imidazolium compound of the formula:

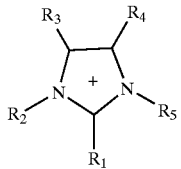

wherein $R_1$, $R_2$, $R_3$, and $R_4$ are the same or different and are selected from the group consisting of hydrogen, an alkyl of 1–4 carbon atoms, and fluoroalkyl groups, (b) an ammonium compound of the formula:

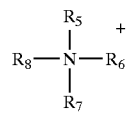

wherein $R_5$, $R_6$, $R_7$, and $R_8$, are the same or different and consists of alkyl of 1–4 carbon atoms, or fluoroalkyl groups, and (c) a tetraalkylammonium compound of the formula:

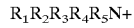

$R_1R_2R_3R_4R_5N+$ wherein $R_1$, $R_2$, $R_3$, $R_4$, and $R_5$ are the same or different and consists of alkyl of 1–4 carbon atoms, said salt being present in a molar concentration of at least 0.4, and an anion selected from the group consisting of triflate, tetrafluoroborate ($BF_4^-$) hexafluoroarsenate ($AsF_6^-$), hexafluorophosphate ($PF_6^-$), fluoro hydrogen fluoride ($F(HF)_x$), wherein x is 1–4, and imide, with the proviso that when a single salt is used there are at least two different solvents and when there is more than one salt there are one or more solvents.

The ammonium $F(HF)_x$ salt can comprise the cation of formula I,II and/or a mixture thereof. The quaternary ammonium $F(HF)_x$ salts which may be used include tetraethylammonium $F(HF)_{2.33}$, tetramethyl ammonium $F(HF)_x$ salt, trimethylethylammonium $F(HF)_x$, trimethyl (n-butyl) ammonium $F(HF)_x$, and methyltrimethyl ammonium $F(HF)_x$.

Other salts which may be added are preferably where the cation is 1,3-dialkyl imidazolium, most preferably, 1-ethyl-3-methylimidazolium, 1-methyl-3-methylimidazolium, 1,2-dimethyl-3-propylimidazolium, trimethylethyl ethylammonium, trimethyl n-proplyl ammonium, and tetraethylammonium and the anion in tetrafluoroborate, hexafluoroarsenate, hexafluorophosphate, and fluoro hydrogen fluoride.

A preferred imidazolium salt is 1-ethyl-3-methylimidazolium tetrafluoroborate.

The one disadvantage of tetraethylammonium tetrafluoroborate as the sole electrolyte salt is that its solubility becomes limited and it starts freezing out at about $-30°$ C. thereby diminishing low temperature performance. It has been found that the methyltriethylammonium tetrafluoroborate (MTEATFB) has higher solubility at these low temperatures and can be cooled as low as $-40°$ C. without precipitating out. MTEATFB has slightly lower conductivity at room temperature (4%) at the same molar concentration compared to the TEATFB.

It has been found that mixtures of these two compounds in an electrochemical solvent exhibit the same conductivity as the pure TEATFB at the same overall molar concentration, i.e., 0.5 MTEATFB plus 0.5 MTEATFB equal the same conductivity as 1.0 MTEATFB within about 2% at $20°$ C. At the same time the low temperature performance of the electrolyte containing the mixture of the two salts is essentially the same as the pure electrolyte containing the two salts down to at least $-40°$ C. In other words the mix of the two salts even though they both dissolved are enhanced slightly in conductivities over the expected additive value of the conductivities at low temperatures. Surprisingly the use of two or more electrolchemical solvents provides a further improvement.

This enhancement is not restricted to just mixtures of these two salts but other highly conductive salts such as imidazolium salts, preferably 1-ethyl-3-methylimidazolium tetrafluoroborate (EMITFB) a known ionic liquid. Solutions of this compound in propylene carbonate at 1 M have a conductivity of 13.0 mS/cm at room temperature while solutions with ethylene carbonate and gamma butyrolac- etone at 1M are about 17.5 mS/cm at room temperature. Although, it is a more expensive compound than MTEATFB and TEATFB limited amounts of it with MTEATFB and TEATFB achieves the maximum conductivity both at room temperature and below –30° C. Therefore mixtures of EMITFB in mixed solvents can be advantageous. This is especially true at low temperatures. This effect could be achieved with imidazolium salt concentrations lower than 0.5M.

Therefore mixtures of highly conductive quaternary ammonium and related imidazolium salts, particularly tetrafluoroborates, have synergistic effect on their solubilities and conductivities at low temperatures when dissolved in higher dielectric solvents.

Propylene carbonate (PC) is used as a safe non-toxic replacement solvent but the relative conductivity of the salt solutions is very much lower, about 12–13 mS/cm systems. In addition, the conductivity drops significantly even more at low temperatures (below 0° C.) with solutions of tetra-ethylammonium tetrafluoroborate (TEATFB). This salt begins freezing out at –30° C. in 1M of solutions which desire performance down to –40° C. On the other hand, methyltriethylammonium tetrafluoroborate (MTEATFB) at 1M has slightly less conductivity at room temperature, but has three times the conductivity of the solution, higher salt concentrations can be used but are limited by the solubility of these salts in the PC. The conductivity usually levels off after about 1.3–1.6M providing the salt has sufficient solubility. We have found that a mix of salts permits these higher up to (0.8 M plus 0.8M=1.6M) concentrations of salt to be used while still keeping this more concentrated electrolyte from freezing down below –30° C. Thus we can achieve an increase in conductivity from about 13 mS/cm to about 15 mS/cm in PC (over 15% increase) while still achieving low temperature performance. The same situations occurs with EMITFB (a more expensive salt) with a small increase in conductivity achieved at 25° C. in the mixed salts at 1.6M concentration over the pure EMITFB while maintaining the same low temperature conductivity. A mix of two or all three of these example salts will perform better in conductivity when considering the room temperature and low temperature properties together.

We have found that partial or total replacement of the PC can be accomplished with gamma butyrolactone (GBL) and or by ethylene carbonate (EC). In addition, ethylene glycol dimethyl ether (DME) can also be used in amounts less than 50% to decrease viscosity without hurting the solubility of the salts and thereby help on conductivity although flammability is compromised. In addition dinitriles such as succinonitrile (SN) and methylglutaronitrile (MGN) can also be mixed in these solvents with the mixed salts. These mixed solvent systems particularly with GBL and EC permit the highest conductivities to be achieved. The additional use of the mixed salts at the same time aids in maintaining the low temperature performance while achieving the highest conductivities in a non acetonitrile solvent at 25° C.

The synergistic effect of the mixed salts becomes more important when these mixed solvents are used to improve the solubility of the salts.

When a mixture of solvents is utilized it is preferred to use either ethylene carbonate or propylene carbonate in the amount of about 30 to 65% by weight in combination with the non-carbonate solvents.

Although mono and dinitrile electrochemical solvents can be used in the mixture of solvents, because of their toxicity and flammability, it is preferable to provide solvents which provide similar performance but safe and non-toxic. Suitable solvents include propylene carbonate, ethylene carbonate, gamma butyrolactone, and dimethoxyethane (ethylene glycol dimethyl ether). If a nitrile solvent is used, it is preferable to use 2-methylglutaronitrile or succinonitrile.

As shown in Table 1 with a mixture of TEATFB and MTEATFB, the conductivity of the mixture is similar at high temperatures as the pure quaternary amnonium salts and enhanced slightly at the lower temperature of the expective additive value. The improvement occurs at a salt concentration between 0.6 and 1.5M.

While the present invention has been described in conjunction with a preferred embodiment, one of ordinary skill, after reading the foregoing specification, will be able to effect various changes, substitutions of equivalents, and other alterations to the compositions and methods set forth herein.

What is claimed is:

1. A non-aqueous electrolyte for electric storage devices which comprises an organic electrochemical solvent and a conductive salt comprising a cation selected from the group consisting of (a) an imidazolium compound of the formula:

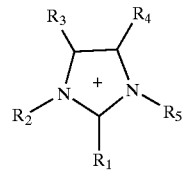

wherein $R_1$, $R_2$, $R_3$, $R_4$ and $R_5$ are the same or different and are selected from the group consisting of hydrogen, an alkyl of 1–4 carbon atoms, and fluoroalkyl, (b) an ammonium compound of the formula:

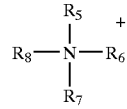

wherein $R_6$, $R_7$, $R_8$, and $R_9$, are the same or different and consists of alkyl of 1–4 carbon atoms, or fluoroalkyl, and (c) a tetraalkylammonium compound of the formula:

$R_1R_2R_3R_4R_5N+$ wherein $R_1$, $R_2$, $R_3$, $R_4$, and $R_5$ are the same or different and consists of alkyl of 1–4 carbon atoms, and an anion selected from the group consisting of triflate, tetrafluoroborate, hexafluoroarsenate, hexafluorophosphate, fluorohydrogenfluoride, and imide said salt being present in a molar concentration of at least 0.4, with the proviso that when a single salt is used there are at least two different solvents, and when there is more than one kind of salt, there are one or more solvents.

2. The non-aqueous electrolyte of claim 1 wherein said salt is present in a molar range of 0.4 to 2.5.

3. The non-aqueous electrolyte of claim 1 wherein said salt is tetraalkylammonium tetrafluoroborate.

4. The non-aqueous electrolyte of claim 1 in combination with a solvent selected from the group consisting of succinonitrile, and methylglutaronitrile.

5. The non-aqueous electrolyte of claim 1 wherein said solvent comprises about 30 to 65 weight percent of ethylene carbonate.

6. The non-aqueous electrolyte of claim 1 wherein said imidazolium cation is selected from the group consisting of 1,3-dialkylimidazolium, 1,2-dialkylimidazolium and said anion is tetrafluoroborate.

7. The non-aqueous electrolyte of claim 1 wherein said imidazolium cation is 1-ethyl-3-methylimidazolium and said anion is tetrafluoroborate.

8. The non-aqueous electrolyte of claim 1 wherein said cation is tetraethylammonium and said anion is tetrafluoroborate.

9. The non-aqueous electrolyte of claim 1 comprising a salt mixture of tetraethylammonium tetrafluoroborate, and 1-methyl-3-imidazolium tetrafluoroborate, and at least one solvent selected from the group consisting of propylene carbonate, ethylene carbonate, gamma butyrolactone and dimethoxyethane.

10. The electrolyte of claim 1 wherein said solvent comprises 30–65 percent by weight of ethylene carbonate and a solvent selected from the group consisting of gamma glutaronitrile and dimethoxyethane.

11. The electrolyte of claim 1 comprising an equimolar mixture of tetraethylammonium tetrafluorborate, and methylethylammonium tetrafluoroborate, and a dialkylimidazolium tetrafluoroborate.

12. In a double layer capacitor having a non-aqueous electrolyte the improvement wherein the electrolyte consists of the electrolyte of claim 1.

13. In a double layer capacitor having a non-aqueous electrolyte the improvement wherein the electrolyte consists of the electrolyte of claim 2.

14. In a double layer capacitor having a non-aqueous electrolyte the improvement wherein the electrolyte consists of the electrolyte of claim 3.

15. In a double layer capacitor having a non-aqueous electrolyte the improvement wherein the electrolyte consists of the electrolyte of claim 4.

16. In a double layer capacitor having a non-aqueous electrolyte the improvement wherein the electrolyte consists of the electrolyte of claim 5.

17. In a double layer capacitor having a non-aqueous electrolyte the improvement wherein the electrolyte consists of the electrolyte of claim 6.

18. In a double layer capacitor having a non-aqueous electrolyte the improvement wherein the electrolyte consists of the electrolyte of claim 7.

19. In a battery having a non-aqueous electrolyte the improvement wherein the electrolyte consists of the electrolyte of claim 1.

* * * * *